United States Patent
Wada et al.

(10) Patent No.: US 7,164,428 B2
(45) Date of Patent: Jan. 16, 2007

(54) IMAGE DISPLAY SYSTEM, PROJECTOR, IMAGE PROCESSING METHOD, PROGRAM AND INFORMATION STORAGE MEDIUM

(75) Inventors: Osamu Wada, Ina (JP); Hideki Matsuda, Fujimi-machi (JP)

(73) Assignee: Seiko Epson Corporation, Tokyo (JP)

(*) Notice: Subject to any disclaimer, the term of this patent is extended or adjusted under 35 U.S.C. 154(b) by 759 days.

(21) Appl. No.: 10/372,241

(22) Filed: Feb. 25, 2003

(65) Prior Publication Data
US 2003/0179211 A1 Sep. 25, 2003

(30) Foreign Application Priority Data
Mar. 25, 2002 (JP) .............................. 2002-082721

(51) Int. Cl.
G09G 5/02 (2006.01)
G06K 9/00 (2006.01)
(52) U.S. Cl. ........................ 345/590; 345/595; 382/167
(58) Field of Classification Search ................ 345/590, 345/593, 595
See application file for complete search history.

(56) References Cited

U.S. PATENT DOCUMENTS

| | | | |
|---|---|---|---|
| 5,642,172 A | 6/1997 | Yoon et al. | |
| 5,739,809 A | 4/1998 | McLaughlin et al. | |
| 6,850,214 B1 | 2/2005 | Nishitani et al. | |
| 6,894,697 B1 | 5/2005 | Matsuda | |
| 6,992,682 B1* | 1/2006 | D'Souza et al. | 345/589 |
| 7,011,413 B1 | 3/2006 | Wada | |
| 2002/0149786 A1* | 10/2002 | Hudson et al. | 358/1.9 |
| 2003/0147053 A1 | 8/2003 | Matsuda et al. | |
| 2003/0179192 A1* | 9/2003 | Allen et al. | 345/207 |

FOREIGN PATENT DOCUMENTS

| | | |
|---|---|---|
| EP | 1 079 605 A2 | 2/2001 |
| EP | 1 178 672 A2 | 2/2002 |
| EP | 1 205902 A2 | 5/2002 |
| JP | A 58-75384 | 5/1983 |
| JP | A 2-157897 | 6/1990 |
| JP | A 3-74969 | 3/1991 |
| JP | A 06-189325 | 7/1994 |
| JP | A 8-65701 | 3/1996 |
| JP | A 9-190170 | 7/1997 |
| JP | A 11-146232 | 5/1999 |

(Continued)

*Primary Examiner*—Kee M. Tung
*Assistant Examiner*—Aaron M. Richer
(74) *Attorney, Agent, or Firm*—Oliff & Berridge, PLC

(57) ABSTRACT

To provide an image display system, projector, image processing method, program and information storage medium enabling to shorten the time required for calibration when the color and brightness of an image is corrected in consideration of the influence of the ambient light, there is provided a liquid crystal projector having: a calibration signal generation section for generating four types of calibration image signals; a color light sensor for colorimetry of calibration images; a color correction section for correcting image information based on the color information from the color light sensor to correct the color of the image; and a brightness correction section for correcting the image information based on the color information from the color light sensor to correct the brightness of the image. The liquid crystal projector displays the image after the image information is corrected such that the color and brightness of the image are corrected according to the viewing environment.

10 Claims, 11 Drawing Sheets

FOREIGN PATENT DOCUMENTS

| | | |
|---|---|---|
| JP | B2 2956401 | 7/1999 |
| JP | A 2001-060082 | 3/2001 |
| JP | A 2001-343957 | 12/2001 |
| JP | A 2002-041016 | 2/2002 |
| JP | A 2003-050572 | 2/2003 |
| JP | A 2003-333614 | 11/2003 |
| WO | WO 02/097784 A1 | 12/2002 |

* cited by examiner

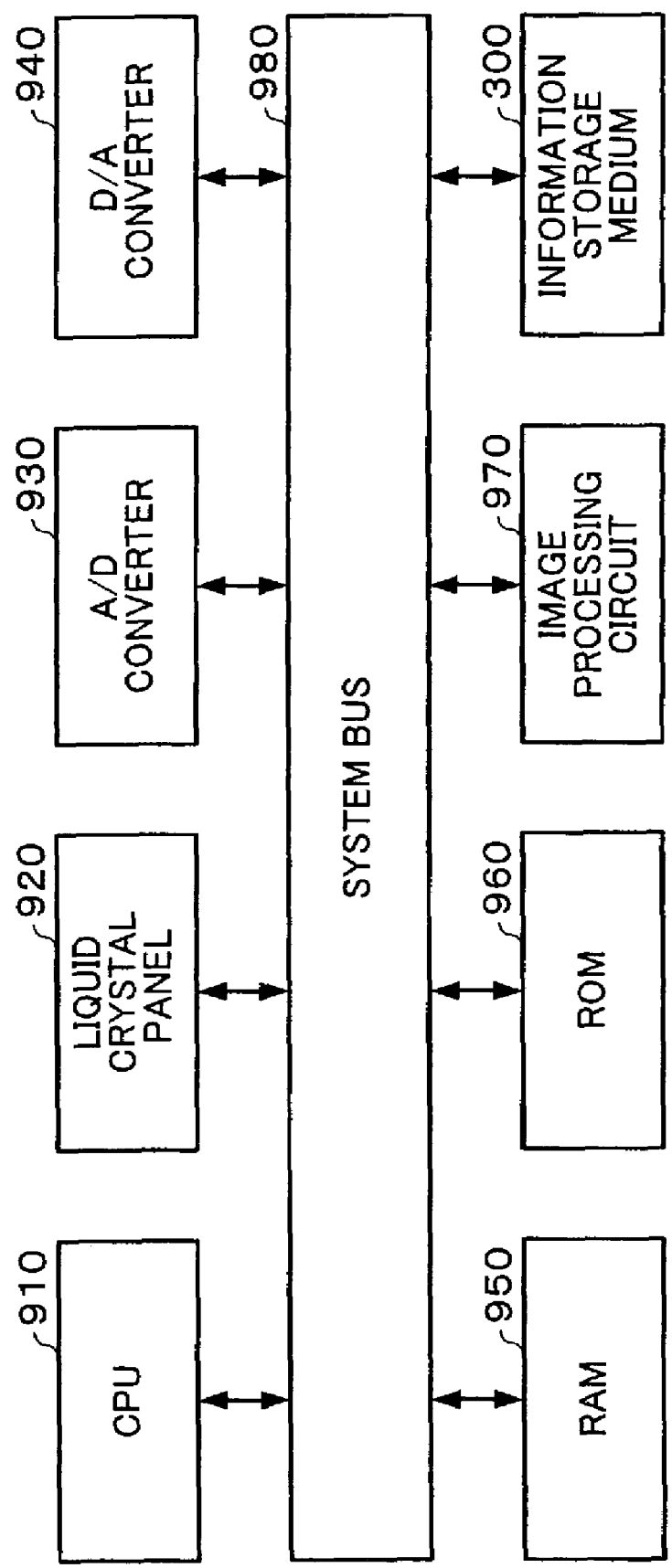

IMAGE DISPLAY SYSTEM, PROJECTOR, IMAGE PROCESSING METHOD, PROGRAM AND INFORMATION STORAGE MEDIUM

Japanese Patent Application No. 2002-82721, filed on Mar. 25, 2002, is hereby incorporated by reference in its entirety.

BACKGROUND OF THE INVENTION

The present invention relates to an image display system, projector, image processing method, program and information storage medium used to display an image in consideration of the ambient light.

Color converting systems including a color management system (CMS) have been proposed which can reproduce an image color equivalent to a target color based on image types such as sRGB and on image display systems such as NTSC.

However, the brightness of the image in addition to its color will be varied if the system is influenced by the ambient light including illumination and sunlight rays.

It is thus required to correct the image information in consideration of the ambient light (such as illumination and sunlight rays).

For example, Japanese Patent No. 2,956,401 discloses a system which controls the characteristic of level conversion depending on the level of an external light measured by an illuminance measuring means.

Such a system can correct the brightness of the image. It is however difficult to correct the color of the image merely by measuring the illuminance.

When image color is corrected in consideration of the ambient light, furthermore, a plurality of basic calibration images are displayed for colorimetry and correction for predetermined grayscale levels of red (R), green (G), blue (B) and white (W) colors, so that a lot of time is required to generate data (such as matrix or one-dimensional lookup table) for colorimetry and correction of image information. The amount of such data for correction becomes great.

BRIEF SUMMARY OF THE INVENTION

The present invention is devised in the light of the above problems and may provide an image display system, projector, image processing method, program and information storage medium enabling to shorten the time required for calibration when the color and brightness of an image is corrected in consideration of the influence of the ambient light.

According to a first aspect of the present invention, there is provided an image display system comprising:

image display means for projecting four calibration images including red, green, blue and white colors each having a given grayscale value onto a display area viewing environment detection means for detecting color information of the projected four calibration images on a display area under viewing environment, color gamut computation means for computing a present environment color gamut capable of being displayed by the image display means under the viewing environment, and for computing a ratio of an area of the present environment color gamut to an area of an ideal environment color gamut capable of being displayed by the image display means under a predetermined viewing environment, color correcting means for correcting image information representing an image to correct the color of the image on the basis of the color information; and brightness correction means for correcting grayscale characteristic information on the basis of the computed ratio to adjust the brightness of the image when the ratio is other than one, and for correcting the image information which has been corrected by the color correcting means on the basis of the grayscale characteristic information and the color information to correct the brightness of the image.

According to a second aspect of the present invention, there is provided an image display system comprising:

an image display section which projects four calibration images including red, green, blue and white colors each having a given grayscale value onto a display area viewing environment detection section which detects color information of the projected four calibration images on a display area under viewing environment, color gamut computation section which computes a present environment color gamut capable of being displayed by the image display section under the viewing environment, and for computing a ratio of an area of the present environment color gamut to an area of an ideal environment color gamut capable of being displayed by the image display section under a predetermined viewing environment, a color correction section which corrects image information representing an image to correct the color of the image on the basis of the color information; and a brightness correction section which corrects grayscale characteristic information on the basis of the computed ratio to adjust the brightness of the image when the ratio is other than one, and further corrects the image information which has been corrected by the color correcting section on the basis of the grayscale characteristic information and the color information to correct the brightness of the image.

According to a third aspect of the present invention, there is provided a projector comprising:

image display means for projecting four calibration images including red, green, blue and white colors each having a given grayscale value onto a display area viewing environment detection means for detecting color information of the projected four calibration images on a display area under viewing environment, color gamut computation means for computing a present environment color gamut capable of being displayed by the image display means under the viewing environment, and for computing a ratio of an area of the present environment color gamut to an area of an ideal environment color gamut capable of being displayed by the image display means under a predetermined viewing environment, color correcting means for correcting image information representing an image to correct the color of the image on the basis of the color information; and brightness correction means for correcting grayscale characteristic information on the basis of the computed ratio to adjust the brightness of the image when the ratio is other than one, and for correcting the image information which has been corrected by the color correcting means on the basis of the grayscale characteristic information and the color information to correct the brightness of the image.

According to a fourth aspect of the present invention, there is provided a projector comprising:

an image display section which projects four calibration images including red, green, blue and white colors each having a given grayscale value onto a display area viewing environment detection section which detects color information of the projected four calibration images on a display area under viewing environment, color gamut computation section which computes a present environment color gamut capable of being displayed by the image display section under the viewing environment, and for computing a ratio of an area of the present environment color gamut to an area of an ideal environment color gamut capable of being displayed by the image display section under a predetermined viewing environment, a color correction section which corrects image information representing an image to correct the color of the image on the basis of the color information; and a brightness correction section which corrects grayscale characteristic information on the basis of the computed ratio to adjust the brightness of the image when the ratio is other than one, and further corrects the image information which has been corrected by the color correcting section on the basis of the grayscale characteristic information and the color information to correct the brightness of the image.

According to a fifth aspect of the present invention, there is provided a computer-readable program causing a computer to function as:

means for causing image display means to project four calibration images including red, green, blue and white colors each having a given grayscale value onto a display area viewing environment detection means for detecting color information of the projected four calibration images on a display area under viewing environment, color gamut computation means for computing a present environment color gamut capable of being displayed by the image display means under the viewing environment, and for computing a ratio of an area of the present environment color gamut to an area of an ideal environment color gamut capable of being displayed by the image display means under a predetermined viewing environment, color correcting means for correcting image information representing an image to correct the color of the image on the basis of the color information; and brightness correction means for correcting grayscale characteristic information on the basis of the computed ratio to adjust the brightness of the image when the ratio is other than one, and for correcting the image information which has been corrected by the color correcting means on the basis of the grayscale characteristic information and the color to correct the brightness of the image.

According to a sixth aspect of the present invention, there is provided a computer-readable information storage medium storing a program for causing a computer to function as:

means for causing image display means to project four calibration images including red, green, blue and white colors each having a given grayscale value onto a display area viewing environment detection means for detecting color information of the projected four calibration images on a display area under viewing environment, color gamut computation means for computing a present environment color gamut capable of being displayed by the image display means under the viewing environment, and for computing a ratio of an area of the present environment color gamut to an area of an ideal environment color gamut capable of being displayed by the image display means under a predetermined viewing environment, color correcting means for correcting image information representing an image to correct the color of the image on the basis of the color information; and brightness correction means for correcting grayscale characteristic information on the basis of the computed ratio to adjust the brightness of the image when the ratio is other than one, and further corrects the image information which has been corrected by the color correcting means on the basis of the grayscale characteristic information and the color information to correct the brightness of the image.

According to the present invention, since both the color and brightness of an image can be corrected by repeating display and colorimetry of calibration images four times, the calibration can be conducted in a time shorter than the prior art.

If the highest grayscale level is used as a predetermined grayscale level, a low-cost sensor having a reduced dynamic range can be used.

A target color may be an ideal color selected by a user, based on video format (e.g., NTSC, PAL or SECAM) or the type of image (e.g., RGB or sRGB).

In the aforementioned image display system, projector, program and information storage medium, the grayscale characteristic information may be gamma curve information; and the brightness correction means may use logistic function to correct the gamma curve information.

Since logistic function is broadly used to estimate the image quality as a function for determining the relationship between the estimation scale by a user and the physical quantity, an image reflecting more properly the brightness feel of a user.

In the aforementioned image display system, projector, program and information storage medium, the brightness correction means may use different parameters for a low-grayscale region and a region other than the low-grayscale region to conduct predetermined computation for the correction of the grayscale characteristic information.

By using different parameters for a low-grayscale region and a region other than the low-grayscale region, an output appropriate to the grayscale level can be obtained.

If a computing equation for increasing an output of the low-grayscale region is also used for a high-grayscale region, an output of the high-grayscale region may excessively be increased, leading to problems such as image collapse.

According to the present invention, such excessive increase in the output and occurrence of image collapse or the like can be prevented by using different parameters for the low-grayscale region and a region other than the low-grayscale region.

The low-grayscale region may include grayscale values ranging from zero to a value lower than the middle level of the grayscale, for example.

Note that there can be provided a plurality of grayscale regions other than the low-grayscale region, and that the brightness correction means may use different parameters for these grayscale regions for predetermined computation to correct the grayscale characteristic information.

According to this configuration, the correction of ambient light can be more naturally carried out since the brightness (or contrast) can be corrected in consideration of the human feel relating to the brightness in a middle range of the grayscale except the lowest and highest grayscale regions.

The image display system may also comprise means for correcting target color information by using the aforementioned ratio.

Furthermore, the program and information storage medium may cause the computer to function as means for correcting the target color information by using the aforementioned ratio.

This makes it possible to correct the target color information in a shorter time considering the adaptive color shift. It is because the adaptive color shift as well as the area of the color gamut is greatly influenced by illumination rays. The present invention can perform the computation of the area of the color gamut in a shorter time to approximately reflect the adaptive color shift to the computation result.

According to a seventh aspect of the present invention, there is provided an image processing method comprising:

outputting the color information each time when one of different calibration images each having a given grayscale value is displayed;

computing a present environment color gamut capable of being displayed by image display means under the viewing environment on the basis of the color information;

computing a ratio of an area of the present environment color gamut to an area of an ideal environment color gamut capable of being displayed by the image display means under a predetermined viewing condition;

correcting grayscale characteristic information on the basis of the computed ratio to adjust the brightness of the image when the ratio is other than one;

correcting image information representing an image on the basis of the color information to correct the color of the image; and further correcting the image information which has been corrected in the color correcting step on the basis of the color information and the grayscale characteristic information to correct brightness of the image.

According to the present invention, since both the color and brightness of an image can be corrected by repeating display and colorimetry of calibration images several times, the calibration can be conducted in a time shorter than the prior art.

In the aforementioned image processing method, the grayscale characteristic information may be gamma curve information; and logistic function may be used to correct the gamma curve information in the brightness correction step.

Since logistic function is broadly used to estimate the image quality as a function for determining the relationship between the estimation scale by a user and the physical quantity, an image reflecting more properly the brightness feel of a user.

In the aforementioned image processing method, different parameters may be used for a low-grayscale region and a region other than the low-grayscale region to conduct predetermined computation for the correction of the grayscale characteristic information in the brightness correction step.

By using different parameters for a low-grayscale region and a region other than the low-grayscale region, an output appropriate to the grayscale level can be obtained.

BRIEF DESCRIPTION OF THE SEVERAL VIEWS OF THE DRAWING

FIG. 11 is a block diagram showing hardware configuration of an image processing section according to one embodiment of the present invention.

DETAILED DESCRIPTION OF THE EMBODIMENTS

The present invention will now be described in connection with an image display system having a liquid crystal projector to which the present invention is applied, with reference to the drawings. Note that the embodiments described below do not in any way limit the scope of the invention defined by the claims laid out herein. Similarly, all the elements of the embodiments described below should not be taken as essential requirements of the present invention.

System Configuration

Figure 1:
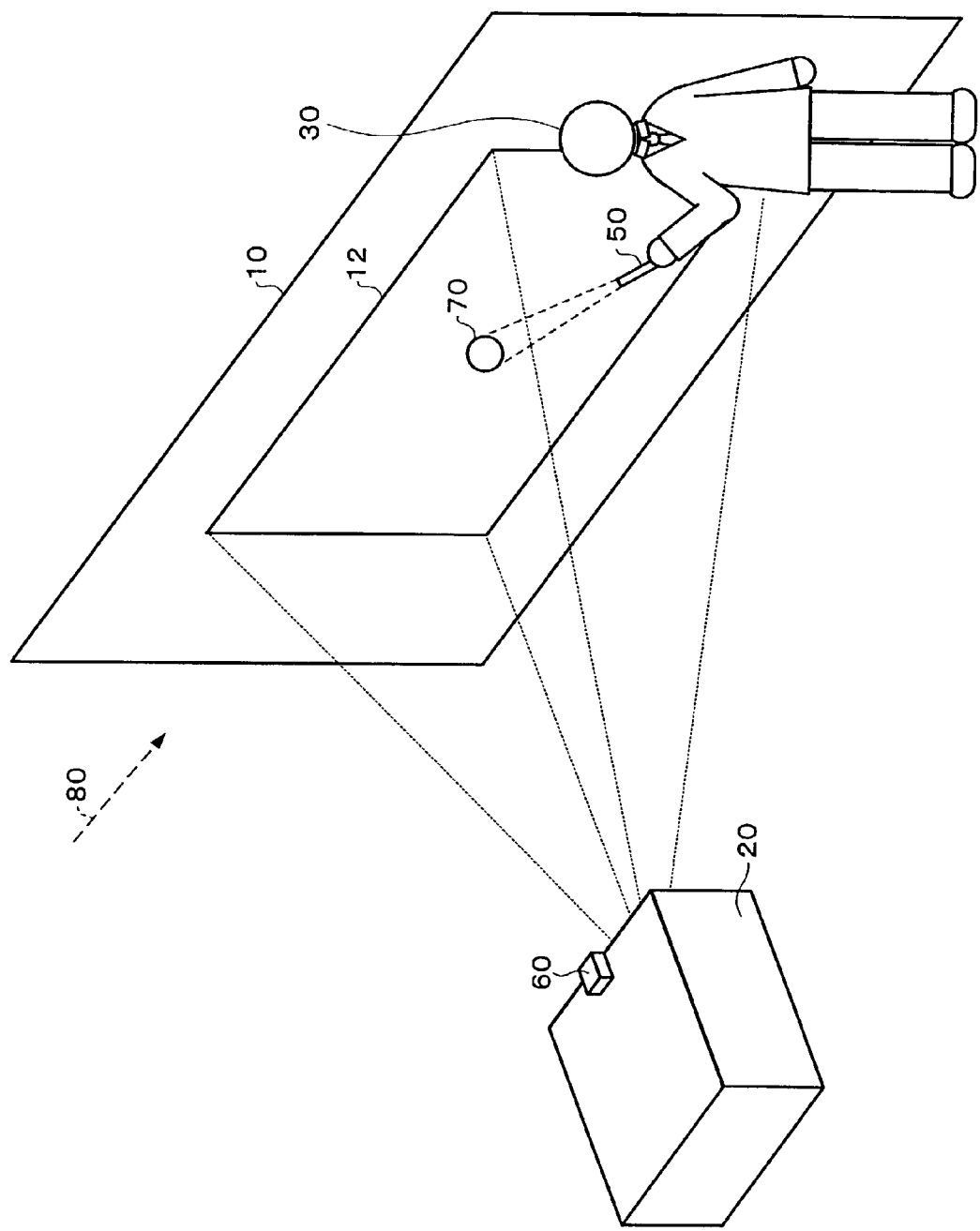
FIG. 1 schematically shows an image display system according to one embodiment of the present invention.

FIG. 1 schematically shows an image display system according to one embodiment of the present invention.

A projector 20 which is a kind of projection type display device is positioned substantially in front of a screen 10 and designed to project a predetermined presentation image onto the screen 10. A presenter 30 performs a presentation toward third persons while pointing a desired location of an image in an image display area 12 on the screen 10 through a spot beam 70 from a laser pointer 50.

In such a presentation, the image appearance in the image display area 12 will greatly be varied depending on the type of the screen 10 and/or ambient light 80. For example, the same white color may show as yellowish or tin white color, depending on the type of the screen 10. In addition, the same white color may show lighter or darker, depending on the ambient light 80.

In recent years, projectors have been increasingly miniaturized to improve the portability. Thus, a portable projector is frequently carried to the customer for presentation. However, it is difficult to pre-adjust the color for the environment in the customer's place. Therefore, the color in the projector is generally manually adjusted in the customer's place. This requires too much time.

In the conventional projectors, the color has been only converted based on an input/output profile which indicates the inherent input/output characteristics thereof, but not in consideration of the viewing environment in which the image is projected. The term "profile" implys herein to mean a characteristic data.

It is however difficult to unify the color appearance in the image unless the viewing environment is considered, as described. The color appearance is determined by three factors, light, light reflection or transmission and visual sense.

This embodiment implements an image display system which can reproduce a proper color appearance in an image by detecting a target color or a specified target color which is set by a user and viewing environment reflected by light and light reflector or transmission.

More particularly, the image display system comprises a color light sensor 60 which functions as viewing environment detection means. The color information from the color light sensor 60 is inputted into the projector 20. Specifically, the color light sensor 60 measures the color information (particularly, tristimulus values of RGB or XYZ) in the image display area 12 on the screen 10.

The projector 20 comprises a conversion means for generating a converting matrix based on the color information from the color light sensor 60 and the selection information in the user's image display system and for correcting image information used in the display of image by using the generated converting matrix.

By detecting the viewing environment based on the color information, the image display system can be realized which can reproduce a proper color appearance in the image.

Furthermore, this embodiment can reproduce a proper color appearance in the image by correcting a target profile (target color information) indicative of a color gamut in the present environment as well as a target color in an ideal environment and also gamma curve information which is a kind of grayscale characteristic information.

Functional Blocks

The functional blocks of an image processing section in the projector 20 for implementing these functions will be described.

Figure 2:
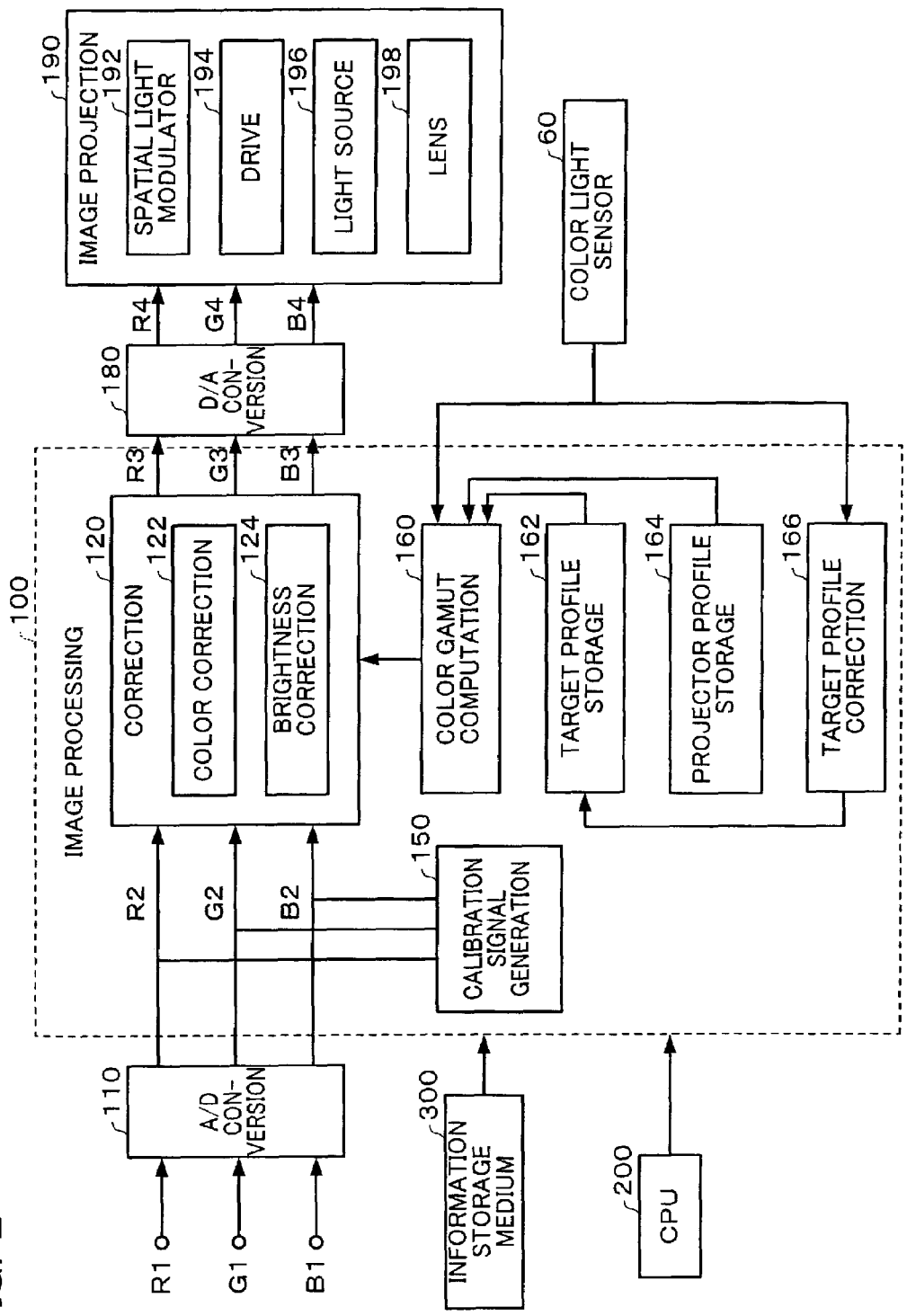
FIG. 2 is a functional block diagram showing an image processing section in a projector according to one embodiment of the present invention.

FIG. 2 is a functional block diagram showing an image processing section 100 in the projector 20 according to one embodiment of the present invention.

The projector 20 is fed signals R1, G1 and B1 forming an analog RGB signal from PC or the like to an A/D conversion section 110 which in turn converts these signals into digital signals R2, G2 and B2, respectively. The image processing section 100 is controlled by CPU 200 to perform the color conversion.

The projector 20 then inputs the color-converted signals R3, G3 and B3 into a D/A conversion section 180 which in turn converts these signals into analog signals R4, G4 and B4. These analog signals are then inputted into an image projection section 190 which is part of the image display means. Then, liquid crystal light valves are driven to perform the projection of image.

The image processing section 100 comprises a correction section 120, a calibration signal generation section 150, a color gamut computation section 160, a target profile storage section 162, a projector profile storage section 164 and a target profile correction section 166.

The calibration signal generation section 150 generates calibration image signals which are in turn inputted into the correction section 120 as digital signals R2, G2 and B2, as the signals outputted from the A/D conversion section 110.

In such a manner, the projector 20 can solely carry out the calibration without inputting of the calibration image signals from any external output device such as PC into the projector 20, since the calibration image signals are internally generated within the projector 20.

The correction section 120 corrects the digital RGB signals (R2, G2 and B2) from the calibration signal generation section 150 into the digital RGB signals (R3, G3 and B3) by referring the projector profile which is managed by the projector profile storage section 164.

More specifically, the correction section 120 generates the digital RGB signals (R3, G3 and B3) based on the digital RGB signals (R2, G2 and B2) referring the projector profile.

The correction section 120 comprises a color correction section 122 and a brightness (grayscale, or input signal values) correction section 124.

The target profile storage section 162 stores target profiles while the projector profile storage section 164 stores projector profiles.

Each of the target profile is a kind of input/output characteristic data for a color to be targeted. The target profiles correspond to the respective image characteristics which can be selected by the user. Each of the projector profiles is a kind of input/output characteristic data corresponding to each of various types of projectors 20.

The target profile correction section 166 functions as a target color information correcting means which corrects a target profile stored in the target profile storage section 162, based on the color information from the color light sensor 60.

The color gamut computation section 160 computes the color gamut such that it has a color and brightness accommodating to the target color and also an image color appearance accommodating to the viewing environment, based on the target profiles (target color information) stored in the target profile storage section 162, the color information from the color light sensor 60 and the projector profiles stored in the projector profile storage section 164.

The image projection section 190 comprises a spatial light modulator 192, a drive section for driving the spatial light modulator 192, a light source 196 and a lens 198.

The drive section drives the spatial light modulator 192 according to the image signals from the D/A conversion section 180. The image projection section 190 projects the light from the light source 196 through the spatial light modulator 192 and lens 198.

Image Processing Flow

The flow of image processing through these sections will be described with reference to the flowchart.

Figure 3:
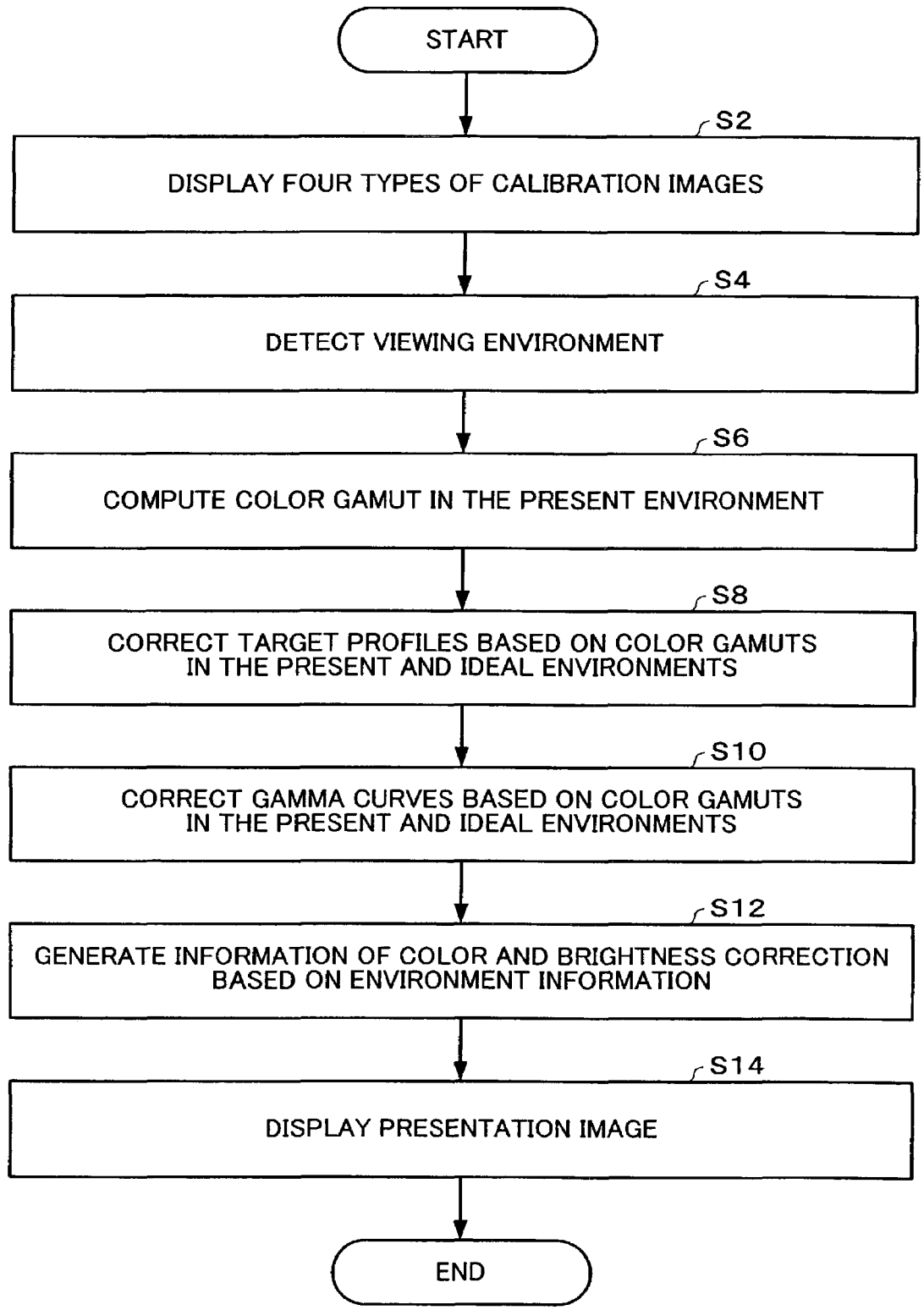
FIG. 3 is a flowchart showing an image processing procedure according to one embodiment of the present invention.

FIG. 3 is a flowchart illustrating the image processing procedure according to one embodiment of the present invention.

The projector 20 causes the calibration signal generation section 150 to generate calibration signals (R2, G2 and B2).

The calibration signal generation section 150 outputs the calibration signals toward the correction section 120.

A color correction section 122 in the correction section 120 corrects the calibration signals using the default (or initial) color converting matrix. A brightness correction section 124 in the correction section 120 corrects and outputs the calibration signals as digital RGB signals (R3, G3 and B3), using the default (or initial) gamma curve.

The D/A conversion section 180 then converts the digital RGB signals into analog RGB signals (R4, G4 and B4). The drive section then drives the spatial light modulator 192 according to the analog RGB signals (R4, G4 and B4). The projector 20 projects calibration images onto the image display area 12 (step S2).

When the calibration images are being displayed on the image display area 12, the color light sensor 60 captures these images on the image display area 12, and then detects the tristimulus values to detect the viewing environment which is in turn outputted toward the color gamut computation section 160 and target profile correction section 166 as color information (step S4). Thus, the color gamut computation section 160 and target profile correction section 166 can detect the viewing environment.

Thus, the viewing environment can more properly be detected by using the calibration images. As a result, the image color appearance can more properly be reproduced.

More particularly, the calibration images represent four colors, for example, Red (R), Green (G), Blue (B) and White (W).

In other words, the viewing environment is detected by displaying the calibration image four times in this embodiment.

The color gamut computation section 160 computes the color gamut in the present environment, based on the color information from the color light sensor 60 (step S6).

The target profile storage section 162 corrects the target profile according to the color gamut in the present and ideal environments based on the information from the color gamut computation section 160 (step S8).

Figure 4:
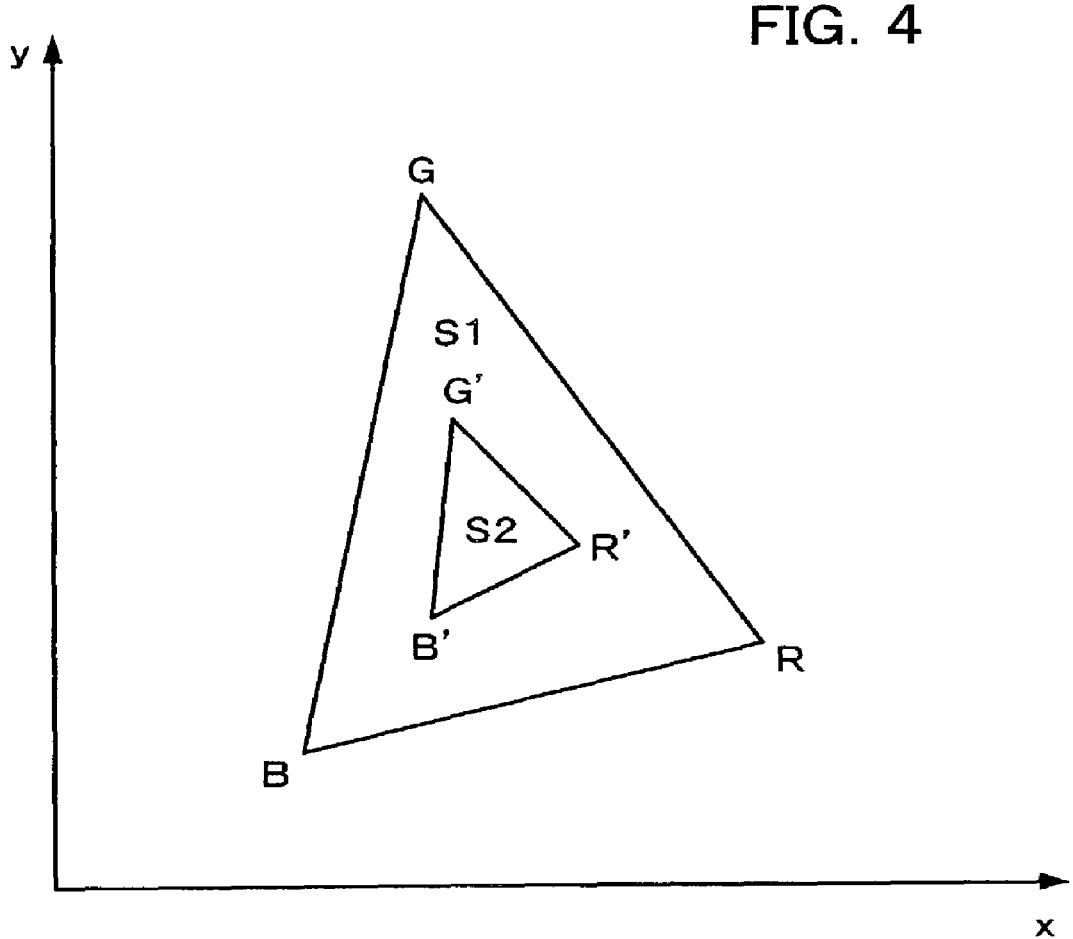
FIG. 4 is an xy chromaticity diagram showing color gamuts which can be displayed by a projector in present and ideal environments.

FIG. 4 is an xy chromaticity diagram showing color gamuts which can be displayed by the projector 20 in present and ideal environments.

In the xy chromaticity diagram of FIG. 4, the area S1 of the displayable color gamut RGB of the projector 20 in the ideal environment (or dark-room condition) is larger than the area S2 of the displayable color gamut R'G'B' of the projector 20 in the present environment (or light-room condition influenced by the ambient light). This is because the present environment provides any influence from the illuminating light or the like.

In this embodiment, the change of environment is detected by using the ratio of S1/S2 (or S2/S1).

In this embodiment, the displayable color gamut in the projector 20 under the viewing environment on performing of the presentation is computed, and also the target gamut in the image display system selected by the user is computed. The computed displayable and target color gamuts are compared with each other to perform the image processing such that the projector 20 can display a color close to the target gamut as much as possible.

The brightness correction section 124 corrects the gamma curve according to the color gamuts in the present and ideal environments based on the information from the color gamut computation section 160 (step S10).

The correction of gamma curve will be described below.

Figure 5:
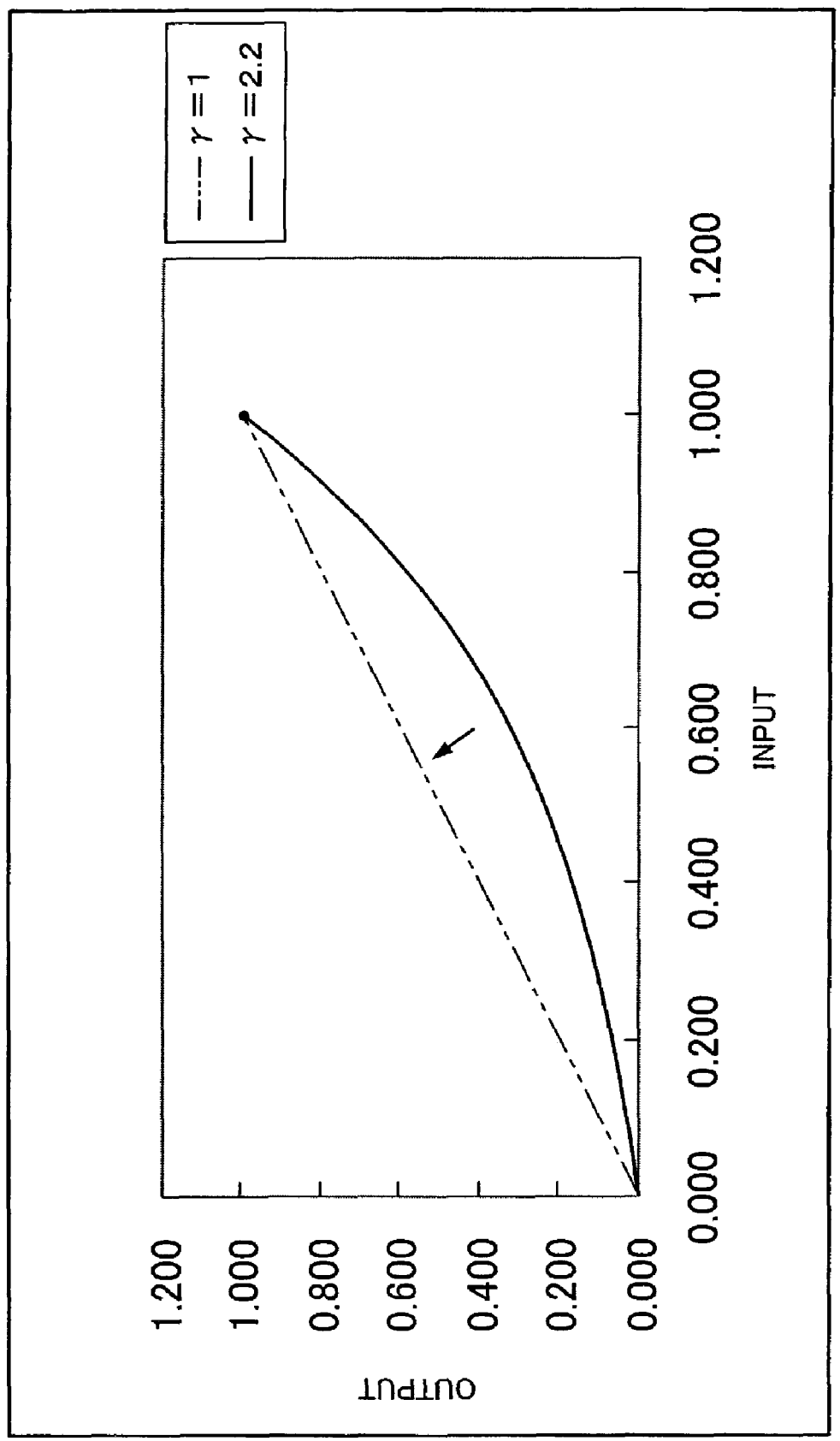
FIG. 5 is a graph showing an example of a gamma curve.

FIG. 5 is a graph showing an example of a gamma curve.

In general, a formula, $y=ax^\gamma$, can be represented where the input grayscale value is x; the output grayscale value is y; the coefficient is a; and the gamma value is $\gamma$. The default value of gamma is 2.2.

If S1/S2 is a value other than one (1), the brightness correction section 124 corrects the gamma curve such that the gamma curve of $\gamma=2.2$ as shown by solid line in FIG. 5 will approach the gamma curve of $\gamma=1$ as shown by two-dot-chain line in FIG. 5.

The color correction section 122 generates the color converting matrix, which is a kind of color correcting information, based on the color information from the color gamut computation section 160. The brightness correction section 124 generates a brightness correction color information, based on the color information from the color gamut computation section 160.

The color correction section 122 performs the color conversion (conversion of image information) using the generated color converting matrix (step S38). More particularly, the color correction section 122 converts the digital RGB signals (R2, G2 and B2) using the three-line-three-row color converting matrix.

The brightness correction section 124 also converts the digital RGB signals converted by the color correction section 122 into the digital RGB signals (R3, G3 and B3) which are in turn outputted therefrom, using the brightness correction color information.

The projector 20 converts the converted digital RGB signals (R3, G3 and B3) into the analog RGB signals (R4, G4 and B4) through the D/A conversion section 180, these analog RGB signals being then used to display an actual presentation image (step S14).

Brightness Correction

The correction of image brightness will be described in more detail. Although FIG. 5 has a single gamma curve for simplification, different parameters are used for the low-grayscale and high-grayscale regions and different gamma curves are used for low-grayscale and high-grayscale regions. This will be described below.

For example, the brightness correction section 124 may use the following equations to determine an amount of correction $\Delta\gamma$ for $\gamma$ (gamma value) to obtain a corrected gamma value $\gamma'$.

$$\Delta\gamma = -h(\gamma - \gamma\text{min}) + (1 + \text{EXP}(-\alpha))^{-1} \quad (1)$$

$$\gamma' = \gamma + \Delta\gamma \quad (2)$$

The symbol h in the first item of the equation (1) represents an adjustment parameter. The adjustment parameter is automatically determined so that $\Delta\gamma=0$ if $\alpha=0$. The symbol $\alpha$ is the aforementioned brightness correction color information while the symbol $\gamma$min is the minimum $\gamma$ value used as a conversion value controlling data.

More particularly, if it is assumed that the area in the color gamut obtained with the maximum RGB grayscale is S1 and that the area in the color gamut obtained with the maximum R'G'B' grayscale is S2, $(S1/S2-1)\times 1$ can be applied as $\alpha$. The second item in the equation (1) is a logistic function.

A concrete determination of $\Delta\gamma$ will be described below.

Figure 6:
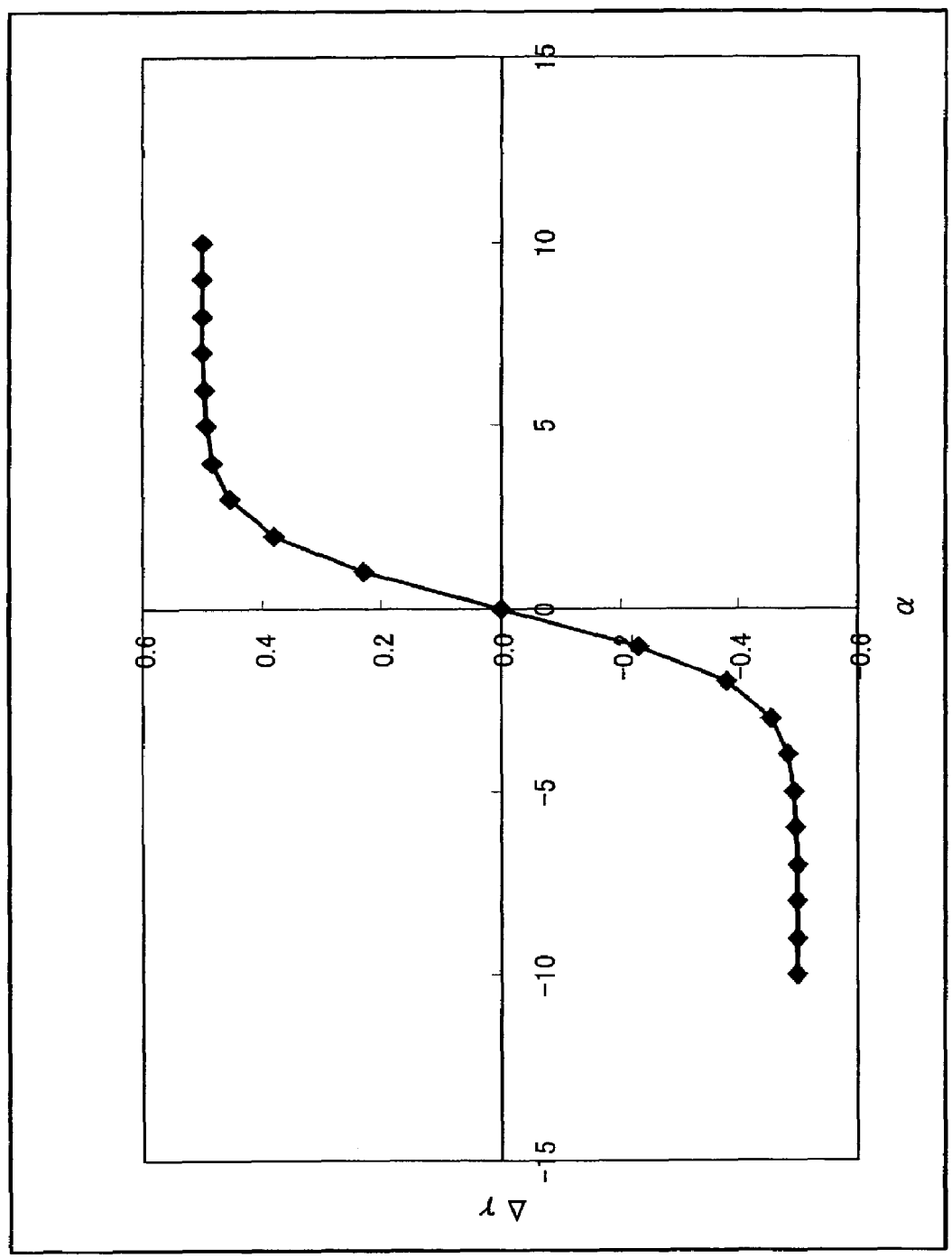
FIG. 6 is a graph showing a variable value $\Delta\gamma$ relative to $\alpha$ according to one embodiment of the present invention.
Figure 7:
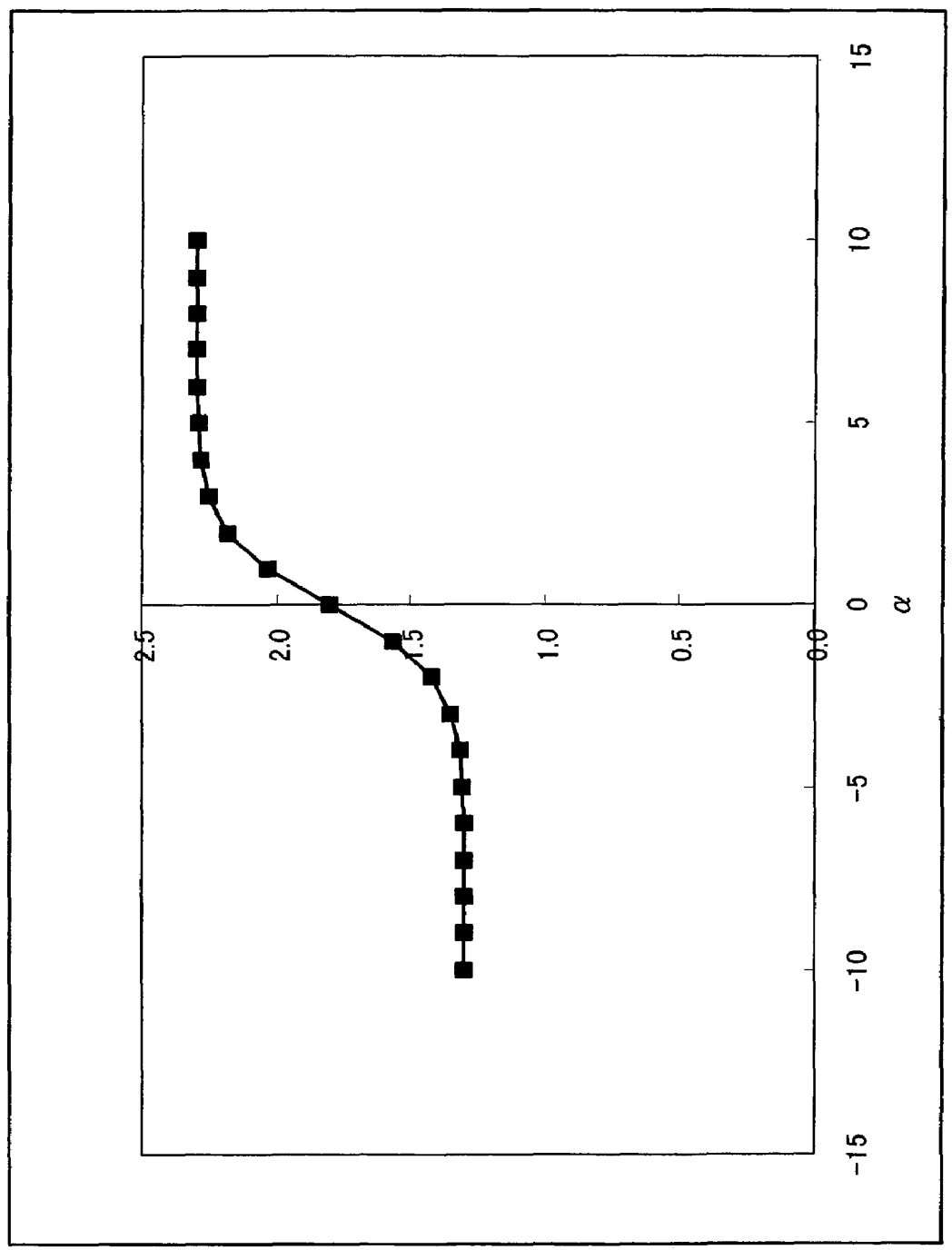
FIG. 7 is a graph showing a variable value $\gamma'$ relative to $\alpha$ according to one embodiment of the present invention.

FIG. 6 is a graph showing a variable value $\Delta\gamma$ relative to $\alpha$ according to one embodiment of the present invention. FIG. 7 is a graph showing a variable value $\gamma'$ relative to $\alpha$ according to one embodiment of the present invention.

It is assumed herein that the default value $\gamma$ is 1.8 and that the default value $\gamma$min is 0.3.

In this case, for example, the values $\Delta\gamma$ and $\gamma'$ respectively may be −0.38 and 1.42 if the $\alpha$-value of the brightness correction color information is −2 or brighter than the standard viewing environment. In other words, the $\gamma$-value becomes smaller if the viewing environment is brighter under influence of the illuminating light or the other.

For example, the values $\Delta\gamma$ and $\gamma'$ respectively may be 0.5 and 2.3 if the $\alpha$-value of the brightness correction color information is 10 or darker than the standard viewing environment. In other words, the $\gamma$-value becomes larger if the viewing environment is darker under influence of the illuminating light or the other.

Figure 8:
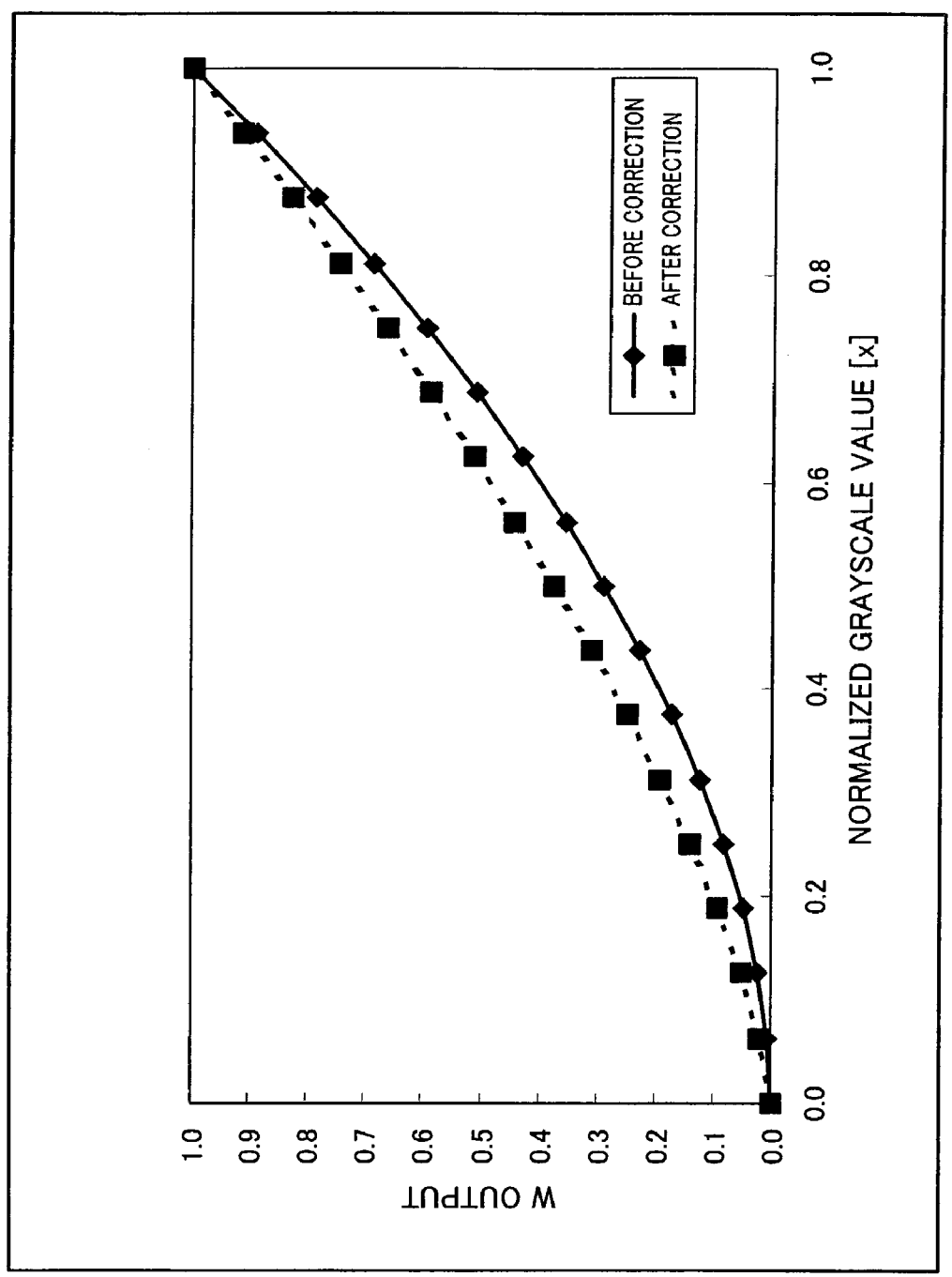
FIG. 8 is a graph showing a variable output relative to a normalized grayscale value x after the correction of the value $\gamma$.

FIG. 8 a graph showing a variable output relative to a normalized grayscale value x after the correction of the value $\gamma$.

FIG. 8 represents the varied output of the white (W) color when the value $\alpha$ is −2 under such conditions as shown in FIGS. 6 and 7.

It will be apparent from FIG. 8 that the output after the correction with respect to the ambient light provides a single curve having its γ-value approaching one (1) in the middle grayscale region other than zero and maximum grayscales.

This is also true of any of the primary color signals R, G and B rather than the white (W) color.

If the γ-value is decreased, the influence of illuminating light or the like can be corrected in the low and middle grayscale regions. However, this may too much increase the output in the high-grayscale region to decrease the contrast such that the image will be collapsed with less visibility.

To overcome such a problem, different values of γ' are preferably used in the low grayscale region and a region other then the low-grayscale region. Thus, a proper color can be reproduced even in the low-grayscale region and a region other then the low-grayscale region.

Figure 9:
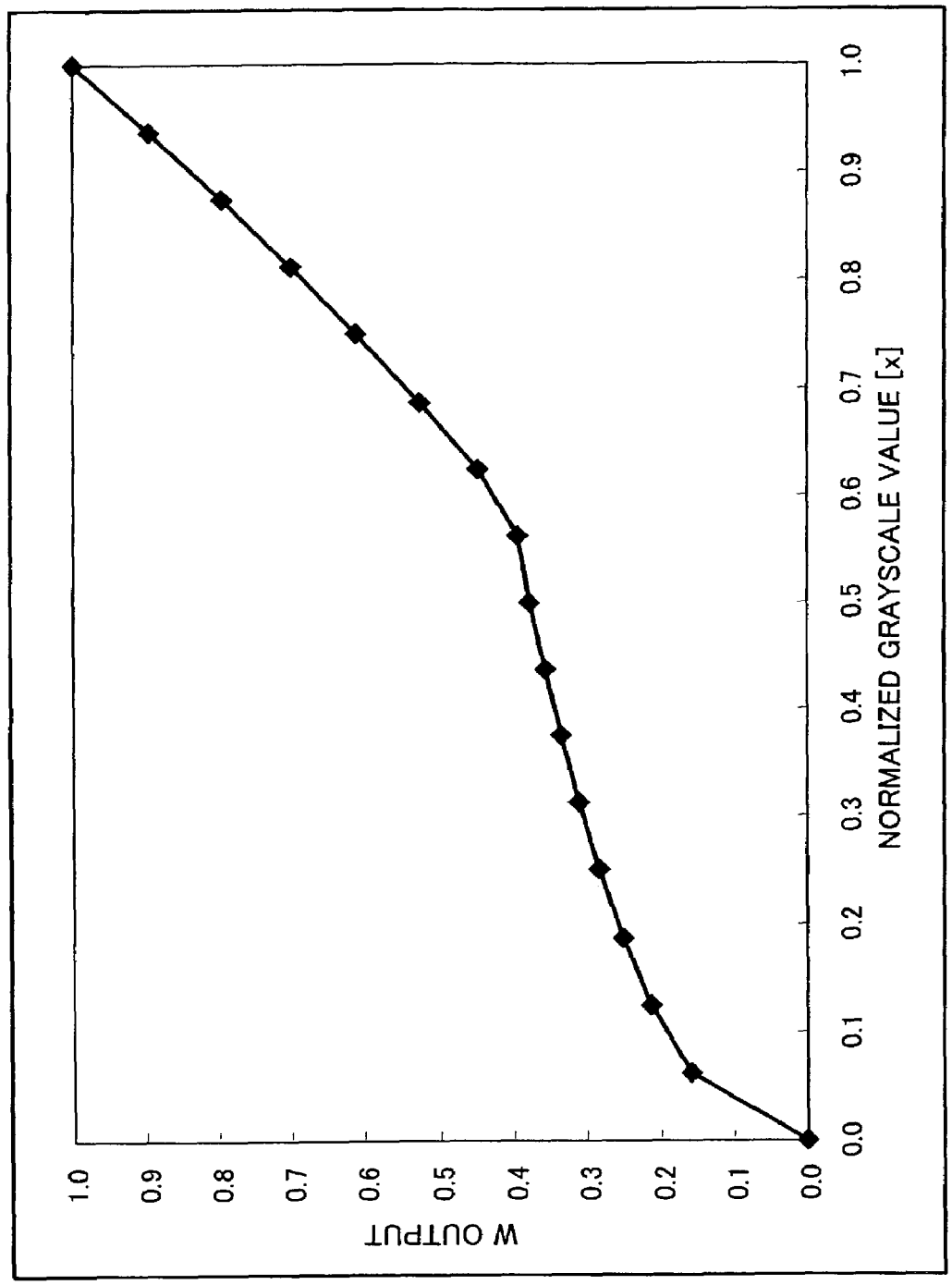
FIG. 9 is a graph showing a variable output when different values $\gamma$ are used for a low-grayscale region and a region other then the low-grayscale region according to one embodiment of the present invention.
Figure 10:
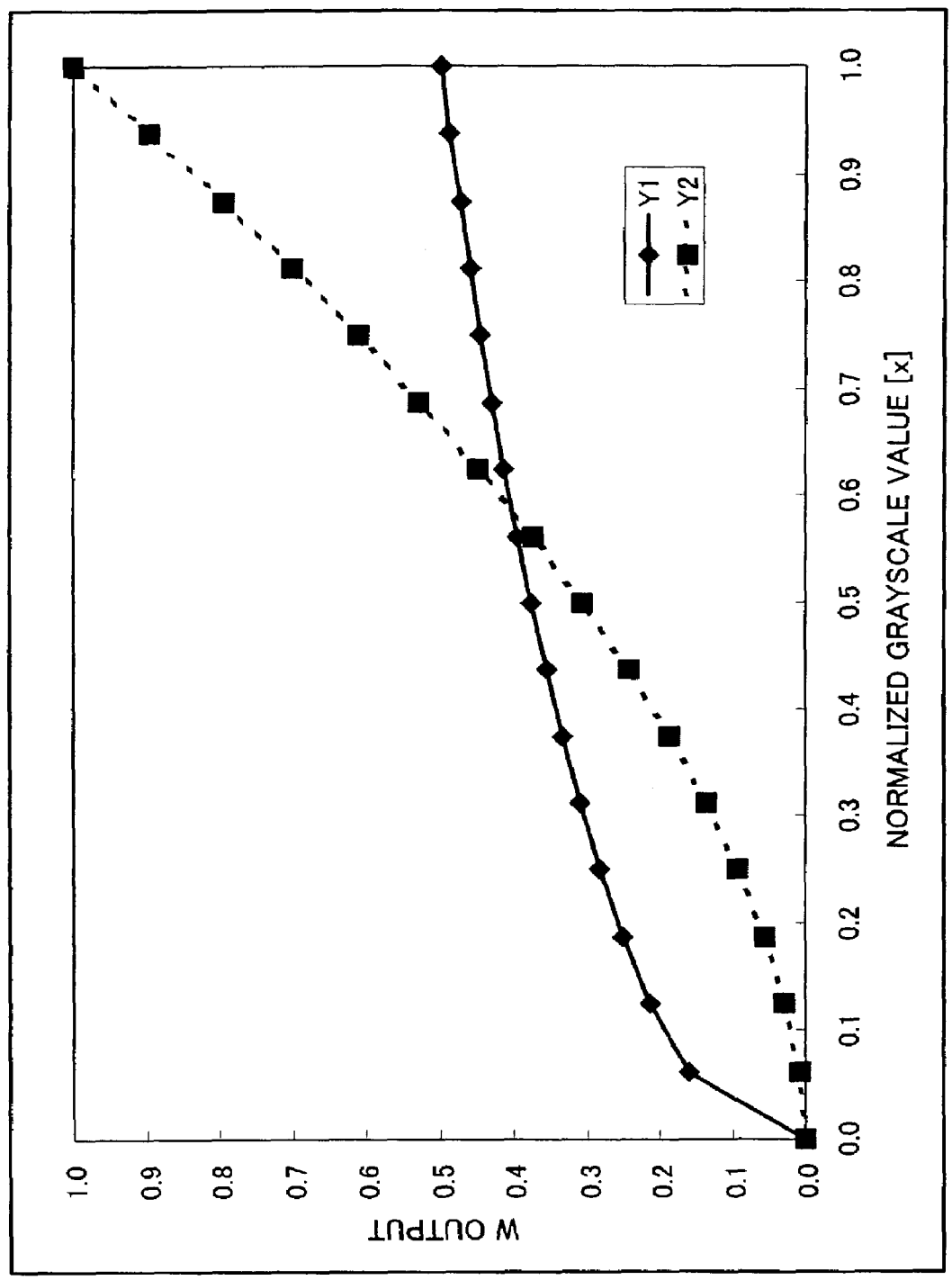
FIG. 10 is a graph showing variable outputs in a low-grayscale region and a region other than the low-grayscale region according to one embodiment of the present invention.

FIG. 9 is a graph showing a variable output when different values γ are used for a low-grayscale region and a region other then the low-grayscale region according to one embodiment of the present invention. FIG. 10 is a graph showing variable outputs in a low-grayscale region and a region other than the low-grayscale region according to one embodiment of the present invention.

For example, it is assumed that the output in the low-grayscale region is determined by using an equation; $Y1=Wmax1*x\hat{}γ'1$ and that the output in a region other than the low-grayscale region is determined by using another equation; $Y2=Wmax2*x\hat{}γ'2$, as shown in FIG. 10. The symbol "^" is intended to mean exponentiation.

In these equations, the symbol γ'1 represents a value provided by correcting the γ-value for the low-grayscale region while the symbol γ'2 represents a value provided by correcting the γ-value for a region other than the low-grayscale region. The values are set such that the value Y1 is larger than Y2 in the low-grayscale region and smaller than Y2 in the high-grayscale region, as shown in FIG. 9.

It is, for example, assumed that in the low-grayscale region, the default value γ1, contract coefficient Wmax1 and γmin1 are respectively equal to 0.5, 0.5 and 0.3 and that in the high-grayscale region, the default value γ2, contract coefficient Wmax2 and γmin2 are respectively equal to 1.8, 1.0 and 1.2. It is also assumed that the α-value is equal to −0.36.

In such a case, the following results are provided through the aforementioned equations for determining the value γ':

γ'1 (for a low-grayscale region)=0.41

γ'2 (for a region other than the low-grayscale region)=1.71

Thus, the output curves in the low-grayscale region and a region other than the low-grayscale region obtained as shown by Y1 and Y2 in FIG. 10.

Thus, such a graph as shown in FIG. 9 may be plotted by taking the curves Y1 and Y2 at the lower and other grayscale regions, respectively.

Therefore, a more proper image can be reproduced by regulating the parameters for a low-grayscale region and a region other than the low-grayscale region since it can reduce any collapse in the image in the low-grayscale region as well as any hopping in the image in the high-grayscale region.

As described, this embodiment enables the calibration to be carried out for a time shorter than the prior art since both the color and brightness in the image can be corrected by performing the display and colorimetry of calibration images several times.

According to this embodiment, proper outputs appropriate to the respective grayscale levels can be provided by using different parameter values for a low-grayscale region and a region other than the low-grayscale region.

In addition, the correction can be carried out in a shorter time in consideration of adaptive color shift by correcting the target profiles and gamma curves based on the ratio of the area of the displayable color gamut in the ideal environment to the area of the displayable color gamut in the present environment. It is because the adaptive color shift as well as the area of the color gamut is greatly influenced by illumination rays. The present invention can perform the computation of the area of the color gamut in a shorter time to approximately reflect the adaptive color shift to the computation result.

Particularly, when the logistic function is used to correct the gamma curve information, it is possible to display an image more properly reflecting the human's feel for brightness. Logistic function is broadly used to estimate the image quality as a function for determining the relationship between the estimation scale by a user and the physical quantity.

Hardware

The hardware parts for accomplishing this embodiment may include the following components.

FIG. 11 is a block diagram showing hardware configuration of an image processing section according to one embodiment of the present invention.

For example, the A/D conversion section 110; D/A conversion section 180; spatial light modulator 192; drive section; correction section 120 and target profile correction section 166; color gamut computation section 160 target profile storage section 162 and projector profile storage section 164; and color light sensor 60 may be implemented by an A/D converter 930; a D/A converter 940; a liquid crystal panel 920; ROM 960 storing a liquid crystal light valve driver; an image processing circuit 970; CPU 910 or RAM 950; RAM 950; a brightness sensor or CCD sensor, respectively. These components can swap information with one another through a system bus 980. Furthermore, these components may be implemented by either of hardware (such as circuits) or software (such as drivers) configuration.

In addition, the functions of the components may be implemented by causing a computer within the liquid crystal projector to read a program out of an information storage medium 300. The information storage medium 300 may be either of CD-ROM, DVD-ROM, ROM, RAM or HDD. The reading of information may be attained by either of contact or non-contact system.

In place of the information storage medium 300, a program for implementing the aforementioned functions can be downloaded from a host device or the like through a transmission line. In other words, the information for implementing aforementioned functions may be embodied by a carrier wave.

Although the present invention has been described above with reference to these embodiments, the present invention is not limited to these embodiments.

Modifications

Although these embodiments related to the four types of calibration images, the number of types of the calibration images is not limited to four.

The present invention can also be applied to such a presentation that an image is to be displayed through any display means other than the aforementioned projection type image display device such as projector. Such a display means may be either type of cathode ray tube (CRT), plasma display panel (PDP), field emission display (FED), electro luminescence (EL), direct-view liquid crystal display device or DMD (digital micromirror device). DMD is a trademark of U.S. Texas Instruments. The present invention may be applied to projectors having DMDs as special light modulators in addition to the liquid crystal projectors. The projector may be of front or back projecting type.

The present invention is also effective for general image displays in various situations such as meeting, medical service, fields of design and fashion, commercial operation, commercial, education, movie, TV, video, game and others, in addition to the presentation.

The function of the image processing section 100 in the aforementioned projector 20 may be implemented by a single image display device (e.g., projector 20) or a distributed processing system (which may comprise the projector 20 and PC).

What is claimed is:

1. An image display system comprising:
   image display means for projecting four calibration images including red, green, blue and white colors each having a given grayscale value onto a display area
   viewing environment detection means for detecting color information of the projected four calibration images on a display area under viewing environment,
   color gamut computation means for computing a present environment color gamut capable of being displayed by the image display means under the viewing environment, and for computing a ratio of an area of the present environment color gamut to an area of an ideal environment color gamut capable of being displayed by the image display means under a predetermined viewing environment,
   color correcting means for correcting image information representing an image to correct the color of the image on the basis of the color information; and
   brightness correction means for correcting grayscale characteristic information on the basis of the computed ratio to adjust the brightness of the image when the ratio is other than one, and for correcting the image information which has been corrected by the color correcting means on the basis of the grayscale characteristic information and the color information to correct the brightness of the image.

2. The image display system as defined in claim 1, wherein:
   the grayscale characteristic information is gamma curve information; and
   the brightness correction means uses logistic function to correct the gamma curve information.

3. The image display system as defined in claim 2, wherein the brightness correction means uses different parameters for a low-grayscale region and a region other than the low-grayscale region to conduct predetermined computation for the correction of the grayscale characteristic information.

4. An image display system comprising:
   an image display section which projects four calibration images including red, green, blue and white colors each having a given grayscale value onto a display area
   viewing environment detection section which detects color information of the projected four calibration images on a display area under viewing environment,
   color gamut computation section which computes a present environment color gamut capable of being displayed by the image display section under the viewing environment, and for computing a ratio of an area of the present environment color gamut to an area of an ideal environment color gamut capable of being displayed by the image display section under a predetermined viewing environment,
   a color correction section which corrects image information representing an image to correct the color of the image on the basis of the color information; and
   a brightness correction section which corrects grayscale characteristic information on the basis of the computed ratio to adjust the brightness of the image when the ratio is other than one, and further corrects the image information which has been corrected by the color correcting section on the basis of the grayscale characteristic information and the color information to correct the brightness of the image.

5. A projector comprising:
   image display means for projecting four calibration images including red, green, blue and white colors each having a given grayscale value onto a display area
   viewing environment detection means for detecting color information of the projected four calibration images on a display area under viewing environment,
   color gamut computation means for computing a present environment color gamut capable of being displayed by the image display means under the viewing environment, and for computing a ratio of an area of the present environment color gamut to an area of an ideal environment color gamut capable of being displayed by the image display means under a predetermined viewing environment,
   color correcting means for correcting image information representing an image to correct the color of the image on the basis of the color information; and
   brightness correction means for correcting grayscale characteristic information on the basis of the computed ratio to adjust the brightness of the image when the ratio is other than one, and for correcting the image information which has been corrected by the color correcting means on the basis of the grayscale characteristic information and the color information to correct the brightness of the image.

6. A projector comprising:
   an image display section which projects four calibration images including red, green, blue and white colors each having a given grayscale value onto a display area
   viewing environment detection section which detects color information of the projected four calibration images on a display area under viewing environment,
   color gamut computation section which computes a present environment color gamut capable of being displayed by the image display section under the viewing environment, and for computing a ratio of an area of the present environment color gamut to an area of an ideal environment color gamut capable of being displayed by the image display section under a predetermined viewing environment,
   a color correction section which corrects image information representing an image to correct the color of the image on the basis of the color information; and
   a brightness correction section which corrects grayscale characteristic information on the basis of the computed ratio to adjust the brightness of the image when the ratio is other than one, and further corrects the image information which has been corrected by the color correcting section on the basis of the grayscale characteristic information and the color information to correct the brightness of the image.

7. An image processing method comprising:

outputting color information each time when one of different calibration images each having a given grayscale value is displayed;

computing a present environment color gamut capable of being displayed by image display means under the viewing environment on the basis of the color information;

computing a ratio of an area of the present environment color gamut to an area of an ideal environment color gamut capable of being displayed by the image display means under a predetermined viewing condition;

correcting grayscale characteristic information on the basis of the computed ratio to adjust the brightness of the image when the ratio is other than one;

correcting image information representing an image on the basis of the color information to correct the color of the image; and further correcting the image information which has been corrected in the color correcting step on the basis of the color information and the grayscale characteristic information to correct the brightness of the image.

8. The image processing method as defined in claim 7, wherein:

the grayscale characteristic information is gamma curve information; and logistic function is used to correct the gamma curve information in the brightness correction step.

9. The image processing method as defined in claim 8, wherein different parameters are used for a low-grayscale region and a region other than the low-grayscale region to conduct predetermined computation for the correction of the grayscale characteristic information in the brightness correction step.

10. A computer-readable information storage medium storing a program for causing a computer to function as:

means for causing image display means to project four calibration images including red, green, blue and white colors each having a given grayscale value onto a display area viewing environment detection means for detecting color information of the projected four calibration images on a display area under viewing environment, color gamut computation means for computing a present environment color gamut capable of being displayed by the image display means under the viewing environment, and for computing a ratio of an area of the present environment color gamut to an area of an ideal environment color gamut capable of being displayed by the image display means under a predetermined viewing environment, color correcting means for correcting image information representing an image to correct the color of the image on the basis of the color information; and brightness correction means for correcting grayscale characteristic information on the basis of the computed ratio to adjust the brightness of the image when the ratio is other than one, and further corrects the image information which has been corrected by the color correcting means on the basis of the grayscale characteristic information and the color information to correct the brightness of the image.

* * * * *